Nov. 10, 1953 — E. C. OLNEY — 2,658,280
COMBINED MICROMETER DEVICE AND SCALE
Filed Nov. 24, 1950
INVENTOR.
Eugene C. Olney
BY Fred C. Matheny
ATTORNEY Patented Nov. 10, 1953

2,658,280

UNITED STATES PATENT OFFICE 2,658,280

COMBINED MICROMETER DEVICE AND SCALE

Eugene C. Olney, Bellingham, Wash.

Application November 24, 1950, Serial No. 197,465

6 Claims. (Cl. 33—107)

This invention relates to a combined micrometer device and scale of a type herein termed a micro-scale.

An object of this invention is to provide a device of this nature which combines micrometer means with a scale in such a manner as to facilitate making very accurate measurements on plane surfaces and to facilitate the setting of a compass or dividers with great ease and a high degree of accuracy.

Another object is to provide a combined micrometer device and scale which can be used in such a manner as to substantially eliminate cumulative errors.

Another object is to provide a combined micrometer device and scale which can be used to great advantage in connection with work which involves decimal dimensioned drawings, or the compiling or reduction of fractional or decimal dimensions, or in connection with metric conversions, or which can be used to furnish proof in connection with the design of intricate mechanical apparatus.

Other objects of this invention are to provide a combined micrometer device and scale which is simple, efficient and durable in construction and design and one which is easily read and used and which makes possible a saving in time and an increase in efficiency and accuracy on the part of the user.

Other objects of the invention will be apparent from the following description taken in connection with the accompanying drawings.

In the drawings:

Figure 1 is a top plan view of a combined micrometer device and scale constructed in accordance with this invention.

Fig. 2 is an edge view of the same looking in the direction of broken line 2—2 of Fig. 1.

Fig. 3 is a bottom plan view of this combined micrometer device and scale.

Fig. 4 is an end view, on a larger scale than Fig. 1 looking in the direction of broken line 4—4 of Fig. 1.

Fig. 5 is a view in cross section, on a larger scale than Fig. 1, taken substantially on broken line 5—5 of Fig. 1.

Fig. 6 is a view partly in longitudinal section and partly in elevation, on a larger scale than Fig. 1, and taken substantially on broken line 6—6 of Fig. 1.

Fig. 7 is a detached top plan view, on a larger scale than Fig. 1, showing a micrometer slide block used in this device.

Fig. 8 is a detached isometric view of a flat metal spring used in connection with this invention.

Fig. 9 is a detached sectional view of a nut used to connect a tension spring with a tie bolt.

Fig. 10 is a detached isomeric view of an index member.

Like reference numerals designate like parts throughout the several views.

This micro-scale comprises a relatively long rectangular base member 10 which is shaped somewhat like an ordinary flat scale but is of substantial thickness, as shown in Figs. 2, 4, 5 and 6. The end portion of the base member 10 which is shown at the left in Fig. 1 is provided with a dove tail shaped groove or recess 11 which is undercut at its sides and is adapted to slidably receive a micrometer slide block 12 of dove tail shape in cross section. The recess 11 extends entirely to one end of the base member 10 so that the slide block 12 may easily be inserted therein.

At the inner end of the recess 11 a rectangular opening 13, Figs. 1, 3 and 6, extends transversely through the base member 10 and is adapted to receive a cylindrical micrometer dial 14. This dial 14 is rigid with a micrometer screw 16 and can be readily grasped between a thumb and finger for the purpose of turning the screw 16. A lock screw 15 may be used to lock the dial 14 to the micrometer screw 16. The micrometer screw 16 is threaded through a nut 18 which is positioned within a rectangular opening 19 in the slide block 12. The inner end portion of the screw 16 extends into a tubular recess 17, Fig. 6, in the base member 10 and bears against a bearing ball 20. Obviously turning of the micrometer dial 14 will turn the screw 16 and turning of the screw 16 will move the micrometer slide 12 longitudinally in the recess 11.

Two spaced apart tie bolts 21 extend through two transversely spaced apart holes 22 in the micrometer slide 12. The heads of the two tie bolts 21 engage with the outer end of the micrometer slide 12 and the inner ends of said tie bolts 21 are threaded into two adapter fittings 23. The adapter fittings 23, see Fig. 9, have integral externally threaded shanks 24 onto which the two end portions of a helical tension spring 25 are respectively threaded so that the tension spring 25 is attached to the bolts 21. The spring 25 is doubled and is disposed within a U-shaped groove 26 in the bottom of the main frame member 10. The bight portion of the spring 25 is engaged over the undercut end portion 27 of a spring retaining rib 28. Rib 28 is integral with the main frame member 10. Spring 25 exerts a constant pull on the micrometer slide 12 and keeps the micrometer screw 16 pressed tightly against the ball 20 at all times. This takes up play and lost motion and insures a high degree of accuracy. If desired a cover plate of thin material may be placed over the spring 25 and secured to the main frame member 10.

A side tension spring 29 of flat metal, see Figs. 7 and 8, is disposed in a recess or pocket 30 in one inclined edge portion of the micrometer slide 12 and is adapted to press against an inclined wall of the recess 11 to prevent side play of the slide 12 and to provide some friction and render the device more accurate. Preferably a bowed medial portion 31 of the spring 29 rests on a curved bottom wall portion 32 of the recess 30 and the end portions of the spring 29 press against the frame member 10.

An angularly shaped index finger or member 33, Figs. 1, 2, 4 and 10, is secured, as by screws 34 to the micrometer slide 12 and extends transversely of the base member 10 and downwardly over one of the beveled edge portions of said base member 10. The index member 33 serves as a reference marker and as a guide and positioning member for the point of one leg of a compass or dividers. Preferably a line 42 is marked on the top of the base member 10 adjacent one edge portion thereof and the index member 33 extends across this line 42. The line 42 serves as a guiding mark to insure proper positioning of a compass or dividers when measurements are being made. Also preferably a beveled notch 35, see Figs. 1 and 10, is provided in the edge portion of the index member 33 and is positioned over the line 42. This beveled notch facilitates accuracy and provides better visibility in connection with the positioning of the point of a compass or dividers against the edge portion of the index member 33.

Preferably an inclined guard member 36 is provided on the base member 10 adjacent the dial 14 and at the side of said dial 14 opposite to the slide 12. This inclined guard member 36 prevents bumping of the dial 14 from the side thereof which is shown at the right in Figs. 1, 2 and 6. A depression 37 is provided in the top of the inclined guard member 36 adjacent to the dial 14 and a reference mark 38 is provided in the depression 37 to serve as a mark by which the dial 14 may be set.

The micrometer slide 12 has a scale 39 marked thereon to indicate the general setting of the slide 12. A mark 40 on the base member 10 facilitates the setting and reading of micrometer slide 12 and scale 39. A finer adjustment or setting of the slide 12 is provided by the micrometer dial 14.

Preferably the edge portions of the base member 10 are beveled as shown in Figs. 1, 4 and 5 and graduations are marked on these beveled edge portions. The beveled edge portion over which the index member 33 extends is shown to be graduated in inches and half inches and these graduations extend up over and onto the top of the base 10 as indicated in Fig. 1. Obviously these markings can be varied. The other beveled edge portion of the base member 10 is provided with graduations in the metric scale.

In the exemplary embodiment of this invention as herein disclosed the circumference of the micrometer dial 14 is divided into twenty-five divisions and the chosen pitch of the micrometer screw 16 is such that a rotary movement equal to one division of said dial 14 will produce a longitudinal movement of .001 of an inch of slide block 12. Each division of the scale 39 on the slide block 12 equals .025 of an inch and preferably each fourth division of the scale 39 is numbered to facilitate reading said scale in .100 of an inch. All readings to the left of the zero mark shown adjacent the index member 33 on Figs. 1 and 2 will be read on the scale 39 and dial 14 and will be in decimals of an inch. Readings to the right of the zero mark on the inches scale will be in inches and fractions of an inch and may be interpolated in inches and decimals of an inch. Measurements are the sum of selected divisions to the right of the zero mark on the inches scale plus the decimal readings indicated on the slide block scale 39 and dial 14. The reading indicated in Fig. 1 of the drawings would be as follows: Seventy-five thousandths of an inch as read on the scale 39 plus ten thousandths of an inch as read on the dial 14 would equal eighty-five thousandths of an inch and this would be added to the reading in inches and fractions thereof taken from the inches scale. Thus if a reading of one and one half inches taken from the inches scale is interpreted decimally as 1.500 inches and to this is added the .085 inch as indicated on scale 39 and dial 14 a total reading of 1.585 is obtained. Similarly any dimension within the range of the instrument can be measured within increments of one thousandth of an inch.

To accurately set dividers or compass for any desired measurement the slide block 12 and dial 14 are first set at the desired decimal or thousandth of an inch. One point of the dividers or compass is then placed against the index member 33 at the edge of the notch 35 and the other point is placed on line 42 and on the selected graduation on the inches scale. If base member 10 is made of plastic or like material which can be marred by the point of dividers or compass then a strip of metal may be inlaid in the base member 10 in the proper position to have the line 42 marked thereon. Applying compass or dividers to this instrument as just hereinbefore described results in the desired accurate setting of the compass or dividers. Obviously this micrometer scale may be used by applying it directly to a drawing or like flat surface to either read or to mark off a desired dimension on the flat surface.

This micrometer scale makes possible the use of a base line on drawings or lay out work wherein fractional or decimal dimensions are concerned as all readings can be converted to decimal equivalents and transferred directly to the scale. Chords and coordinates can be readily laid out by this micrometer scale.

Obviously variations may be made in the scales used on this device and in the way these scales are marked, including the use of different colors to bring out and differentiate different scales and to render them more distinctive. Also decimal equivalents may be used in connection with the inches scale and metric scales may be used. For instance one end portion of this instrument may be provided with micrometer and scale means which reads in inches and the other end portion of the instrument may be provided with micrometer and scale means which reads in the metric scale. When this is done tension springs similar to spring 25 but shorter in length can be used in duplicate.

The use of this micrometer scale saves time and increases accuracy in connection with measurements and lay outs on plane surfaces. It further reduces the danger of cumulative errors, simplifies the work of compiling or reducing fractional or decimal dimensions and can be used to advantage in metric conversions.

It will be understood that this disclosure is illustrative and that changes in this device may be made within the scope of the following claims.

I claim:

1. In a micrometer scale, a base member having a scale marked thereon along one edge portion thereof; a micrometer slide block movable longitudinally of said base member; scale means marked on said slide block and said base member adapted to indicate the general setting of the slide block relative to the scale on said base member; spring means urging said slide block in one direction; micrometer screw means adapted to move said slide block against the pressure of said spring means; a dial carried by said micrometer screw means; other scale means on said dial and said base member cooperating to indicate the exact setting of the slide block relative to the base member; and an index member carried by the slide block cooperating with the scale which is marked on said base member along an edge thereof.

2. In a micrometer scale, a relatively long flat base member having beveled edges and having a dove tail shaped groove extending lengthwise from one end thereof inwardly and having a transverse micrometer dial recess positioned adjacent the inner end of said groove; a micrometer slide block of dove tail shape in cross section slidably disposed within said groove, said slide block having a longitudinal passageway therein and having a transverse nut receiving opening intersecting said passageway and having a spring receiving cavity in one edge thereof; a friction spring disposed in said cavity frictionally contacting a wall of said groove and yieldingly resisting movement of said block; a nut disposed in said transverse nut receiving opening; a micrometer screw disposed in said longitudinal passageway and threaded through said nut; a cylindrical micrometer dial rigid with said screw and disposed in said micrometer dial recess in said base member; a ball in said base member providing a thrust bearing for the inner end of said micrometer screw; and spring means yieldingly urging said slide block and said screw toward said ball.

3. In a micrometer scale, a relatively long flat base member having a groove extending lengthwise thereof from one end inwardly and having a transverse recess extending crosswise thereof adjacent the inner end of said groove; a micrometer slide block slidably disposed in said groove, said slide block having a longitudinal passageway and having a transverse nut receiving opening intersecting said passageway; a nut disposed in said opening; a micrometer screw disposed in the longitudinal passageway of said slide block and threaded through said nut; a dial rigid with said screw and positioned in the transverse recess in the base member and extending above the plane of the top side of the base member; an inclined guard member rigid with said base member and positioned adjacent said dial protecting and shielding said dial; a ball in said base member providing a thrust bearing for the end of said micrometer screw adjacent said dial; and spring means yieldingly urging said slide block and said screw toward said ball.

4. In a micrometer scale, a relatively long flat base member having a groove extending from one end thereof inwardly and having a transverse recess extending crosswise thereof adjacent the inner end of said groove; a micrometer slide block slidably disposed in said groove, said slide block having a longitudinal medial passageway and having a transverse nut receiving opening intersecting said passageway; and having two transversely spaced apart longitudinally extending bolt receiving passageways; a nut disposed in said transverse nut receiving opening; a micrometer screw disposed in said longitudinal medial passageway and threaded through said nut; a cylindrical micrometer dial rigid with said screw and disposed in said transverse recess in said base member; a ball in said base member providing a thrust bearing for the end of said micrometer screw adjacent said dial; a longitudinally disposed U shaped groove provided in the bottom side of said base member and having its two ends positioned adjacent the transverse nut receiving recess in the base member; a helical tension spring disposed in said groove with the medial portion of the spring anchored within the curved end of the U-shaped groove; and two bolts extending through the tie bolt receiving passageways in said slide block and secured to the respective ends of said tension spring, whereby said slide block and micrometer screw are yieldingly urged toward said ball.

5. In a micrometer scale, a relatively long flat base member having beveled edges and having graduations marked along at least one of said beveled edges, said base member having a dove tail shaped groove extending lengthwise thereof from one end inwardly and having a micrometer dial recess extending transversely therethrough adjacent the inner end of said groove; a micrometer slide block of dove tail shape in cross section slidably disposed within said groove, said slide block having a scale marked on its top side and having a longitudinal passageway therein and having a transverse nut receiving opening intersecting said passageway; a reference mark on said base member cooperating with the scale on said slide block; an index member secured to said slide block and overhanging the edge portion of the base member on which the scale is marked; a nut disposed in said nut receiving opening; a micrometer screw disposed in the longitudinal passageway in said slide block and threaded through said nut; a dial rigid with said screw and disposed in the micrometer dial recess of said base member; a scale marked on said dial; a reference mark on said base member cooperating with the scale on said dial; a ball in said base member providing a thrust bearing for the end of the micrometer screw adjacent said dial; and spring means yieldingly urging said slide block and said screw toward said ball.

6. The apparatus as claimed in claim 5 in which the base member has a longitudinally extending straight line marked thereon and intersecting the graduations on the base member and in which an index member is fixed to the slide block and extends crosswise of the base member and is provided with an inclined guide notch in one edge thereof positioned in alignment with said straight line.

EUGENE C. OLNEY.

References Cited in the file of this patent

UNITED STATES PATENTS

| Number | Name | Date |
|---|---|---|
| 8,398 | Parsons | Sept. 30, 1851 |
| 1,648,936 | De Bus | Nov. 15, 1927 |
| 2,554,099 | Ermold | May 22, 1951 |

FOREIGN PATENTS

| Number | Country | Date |
|---|---|---|
| 558,639 | France | May 30, 1923 |